United States Patent [19]

Plamper

[11] Patent Number: 5,659,955
[45] Date of Patent: Aug. 26, 1997

[54] METHOD OF MAKING POWDER METAL HELICAL GEARS

[76] Inventor: Gerhard Plamper, 5620 Sleepy Hollow Rd., Valley City, Ohio 44280

[21] Appl. No.: 184,270

[22] Filed: Jan. 21, 1994

[51] Int. Cl.[6] .......................... B21D 53/28; B21B 19/12
[52] U.S. Cl. ................................. 29/893.32; 72/98
[58] Field of Search ........................ 29/893.3, 893.32; 72/98, 102, 108, 110

[56] References Cited

U.S. PATENT DOCUMENTS

| | | | |
|---|---|---|---|
| 2,542,912 | 2/1951 | Ensign | 29/34 |
| 2,715,846 | 8/1955 | Grob et al. | 72/100 |
| 2,763,519 | 9/1956 | Thomson | 308/240 |
| 2,917,821 | 12/1959 | Fritsch | 29/420.5 |
| 3,298,219 | 1/1967 | Schober | 72/377 |
| 3,355,930 | 12/1967 | Fedorov | 72/377 |
| 3,531,976 | 10/1970 | Fuhrman | 72/102 |
| 3,659,324 | 5/1972 | Murray | 29/898.1 |
| 3,752,003 | 8/1973 | Dunn et al. | 74/434 |
| 3,762,236 | 10/1973 | Dunn et al. | 74/434 |
| 3,772,935 | 11/1973 | Dunn et al. | 74/434 |
| 3,842,646 | 10/1974 | Kuhn | 72/354 |
| 3,867,751 | 2/1975 | Connell et al. | 29/148.4 R |
| 3,874,049 | 4/1975 | Ferguson | 29/149.5 DP |
| 4,059,879 | 11/1977 | Chmura et al. | 29/148.4 R |
| 4,111,031 | 9/1978 | Vennemeyer et al. | 72/359 |
| 4,394,421 | 7/1983 | Chmura et al. | 428/547 |
| 4,571,972 | 2/1986 | Greis et al. | 72/98 |
| 4,708,912 | 11/1987 | Huppmann | 428/547 |
| 5,064,608 | 11/1991 | Suzuki et al. | 419/8 |

FOREIGN PATENT DOCUMENTS

| | | | |
|---|---|---|---|
| 509734 | 10/1992 | European Pat. Off. | 72/108 |
| 3149633 | 8/1982 | Germany | 72/108 |
| 1655640 | 6/1991 | U.S.S.R. | 72/98 |

OTHER PUBLICATIONS

1993 Brochure of Metal Powder Industries Federation entitled "Powder Metallurgy 'Design Solutions'".

Brochure of Merriman, Division of Quamco, Incorporated entitled "Merriman Powder Metal Gears and Structural Parts".

*Primary Examiner*—P. W. Echols
*Attorney, Agent, or Firm*—Tarolli, Sundheim, Covell, Tummino & Szabo

[57] ABSTRACT

A method includes the steps of compacting powder metal to form a powder metal blank, and forming gear teeth on the powder metal blank by rolling the powder metal blank between rolling dies rotating about parallel axes. The step of forming gear teeth on the powder metal blank by rolling includes the steps of rotating the rolling dies about parallel axes and maintaining the distance between the parallel axes constant during forming of the gear teeth on the powder metal blank. Powder metal gears having 45° helical gear teeth are cold rolled. Herringbone gears and pinion gears are made with the 45° helical powder metal gears.

4 Claims, 8 Drawing Sheets

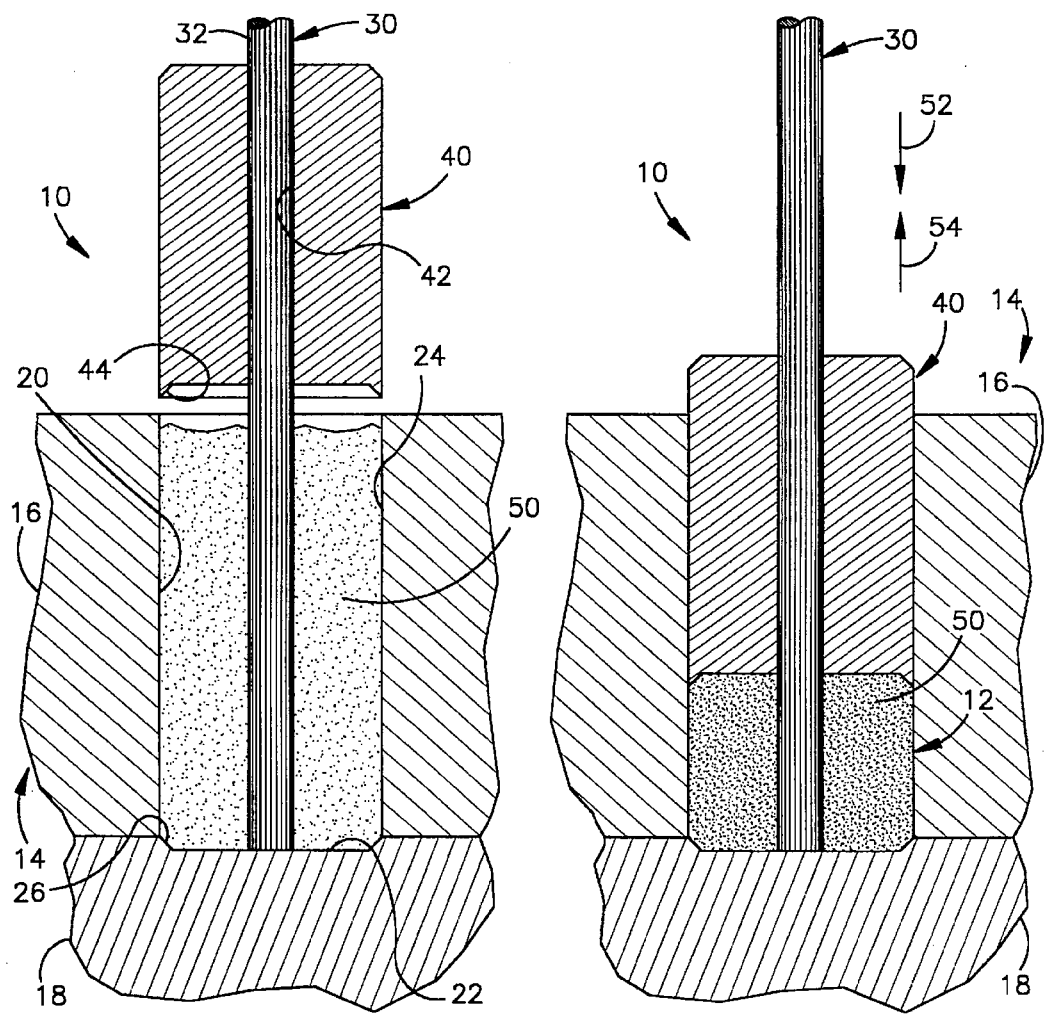
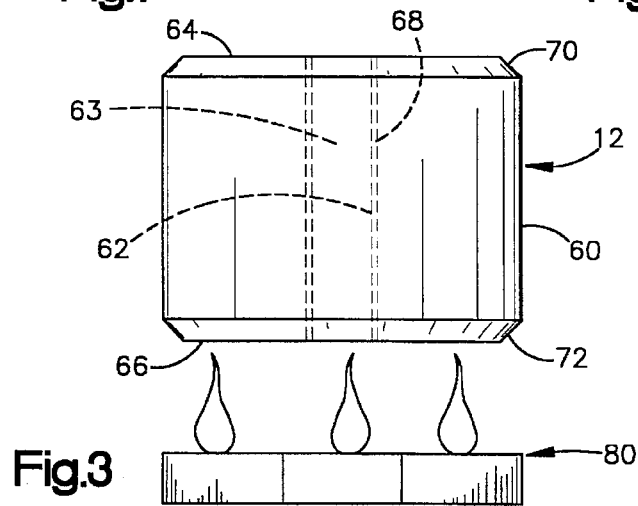
Fig.1  Fig.2  Fig.3

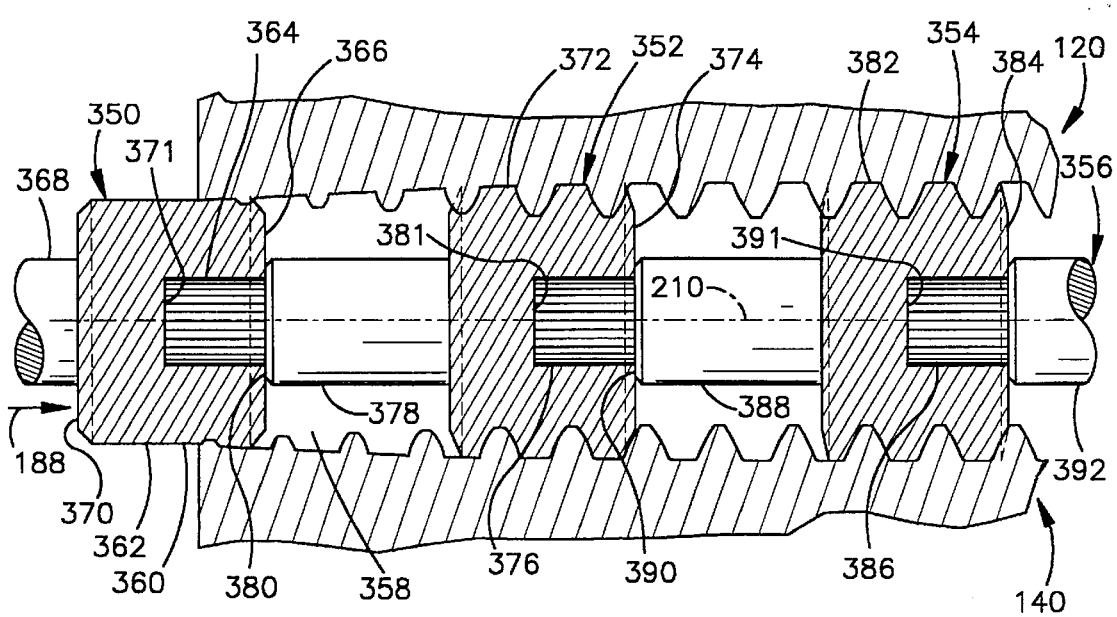
Fig.9
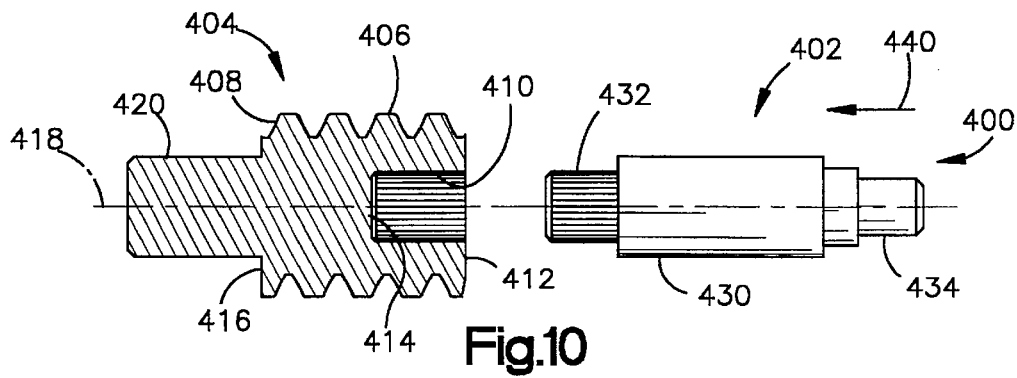
Fig.10
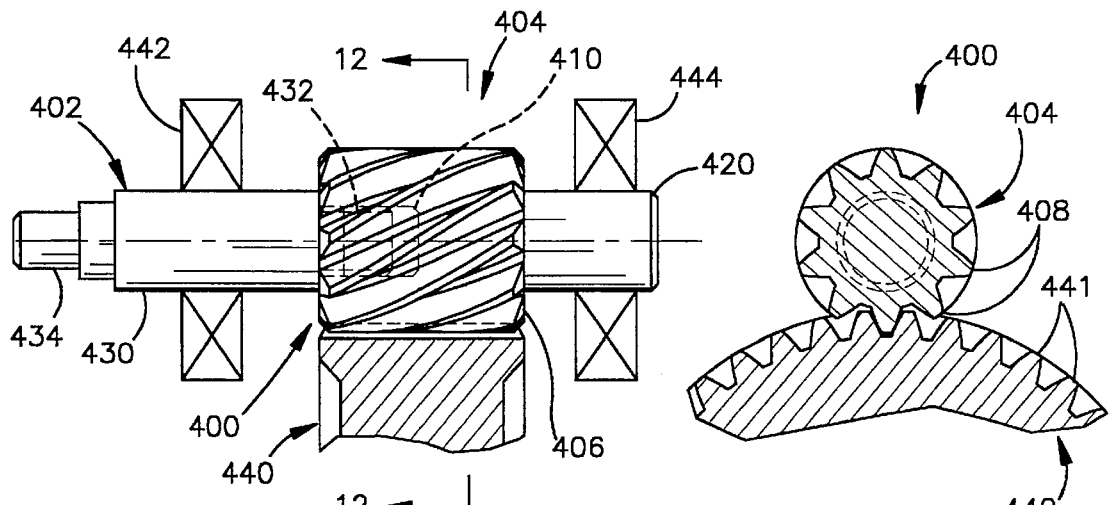
Fig.11
Fig.12

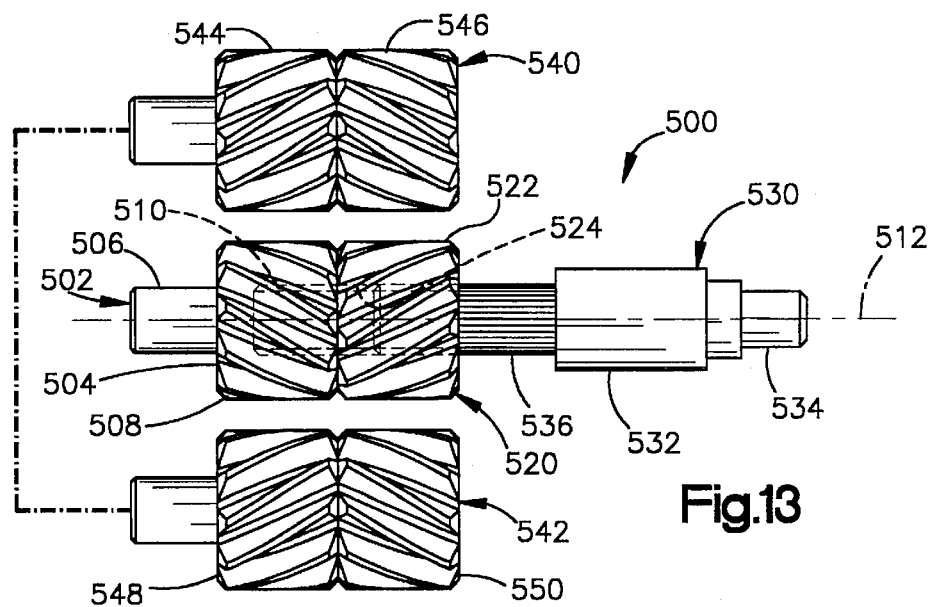
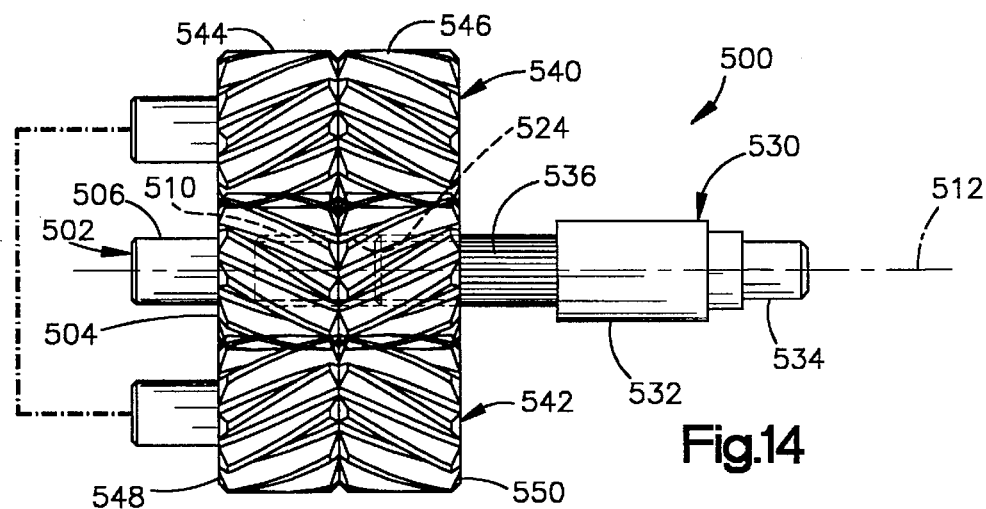
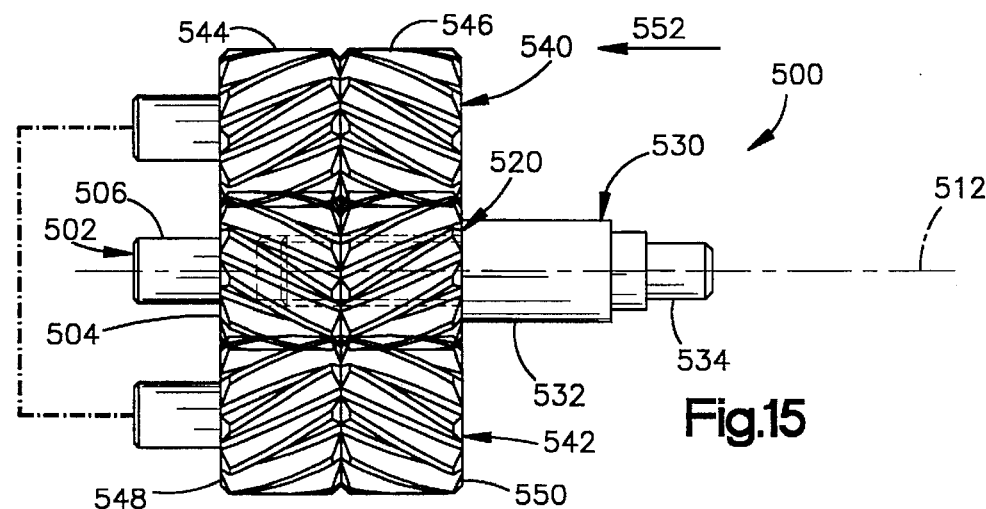

2

METHOD OF MAKING POWDER METAL HELICAL GEARS

BACKGROUND OF THE INVENTION

The present invention relates to a powder metal helical gear, a gear assembly including a powder metal helical gear, and a method of making the powder metal helical gear.

It is known to form helical gear teeth on a powder metal gear during the powder metal compaction process. There is a practical limit on the helix angle of gear teeth formed in this manner, because the powder metal is not yet sintered. If the helix angle is small, such as a few degrees, then the compacted powder metal gear blank can be withdrawn from the die by rotating the gear blank about its axis while pulling axially. However, if the helix angle is large, such as above about 27–30 degrees, then the axial force on the gear teeth caused by this pulling damages or breaks the gear teeth.

Accordingly, it is not feasible to make helical gears with a helix angle of 35° or more by powder metal compaction. Such gears are typically made by machining. Machining a 35° helical gear tooth form is, however, significantly more expensive than powder metal formation. Also, if the machined gear includes an integrally formed shaft or a shaft-receiving cavity, as is necessary for a pinion gear, then the machining process becomes very complex and even more expensive.

SUMMARY OF THE INVENTION

The present invention is a method comprising the steps of compacting powder metal to form a powder metal blank, and forming gear teeth on the powder metal blank by rolling the powder metal blank between rolling dies rotating about parallel axes. The step of forming gear teeth on the powder metal blank by rolling includes the steps of rotating the rolling dies about parallel axes and maintaining the distance between the parallel axes constant during forming of the gear teeth on the powder metal blank.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic sectional view illustrating a first step in compaction of powder metal into a gear blank in accordance with the present invention; FIG. 2 is a schematic sectional view similar to FIG. 1 showing the powder metal in a compacted condition;

FIG. 3 is a schematic pictorial view illustrating sintering of the powder metal gear blank of FIG. 2;

FIG. 9 is a view similar to FIG. 8 illustrating the rolling of helical gear teeth on a plurality of powder metal gear blanks which have stub shafts;

FIG. 10 is an exploded view of a pinion gear assembly incorporating a powder metal gear blank;

FIG. 11 is a pictorial view of portions of a gear drive mechanism incorporating the pinion gear assembly of FIG. 10;

FIG. 12 is a sectional view taken along line 12—12 of FIG. 11; and

FIGS. 13–15 are a series of views illustrating the manufacture of a herringbone gear assembly in accordance with the present invention.

DESCRIPTION OF PREFERRED EMBODIMENT

Figure 4:
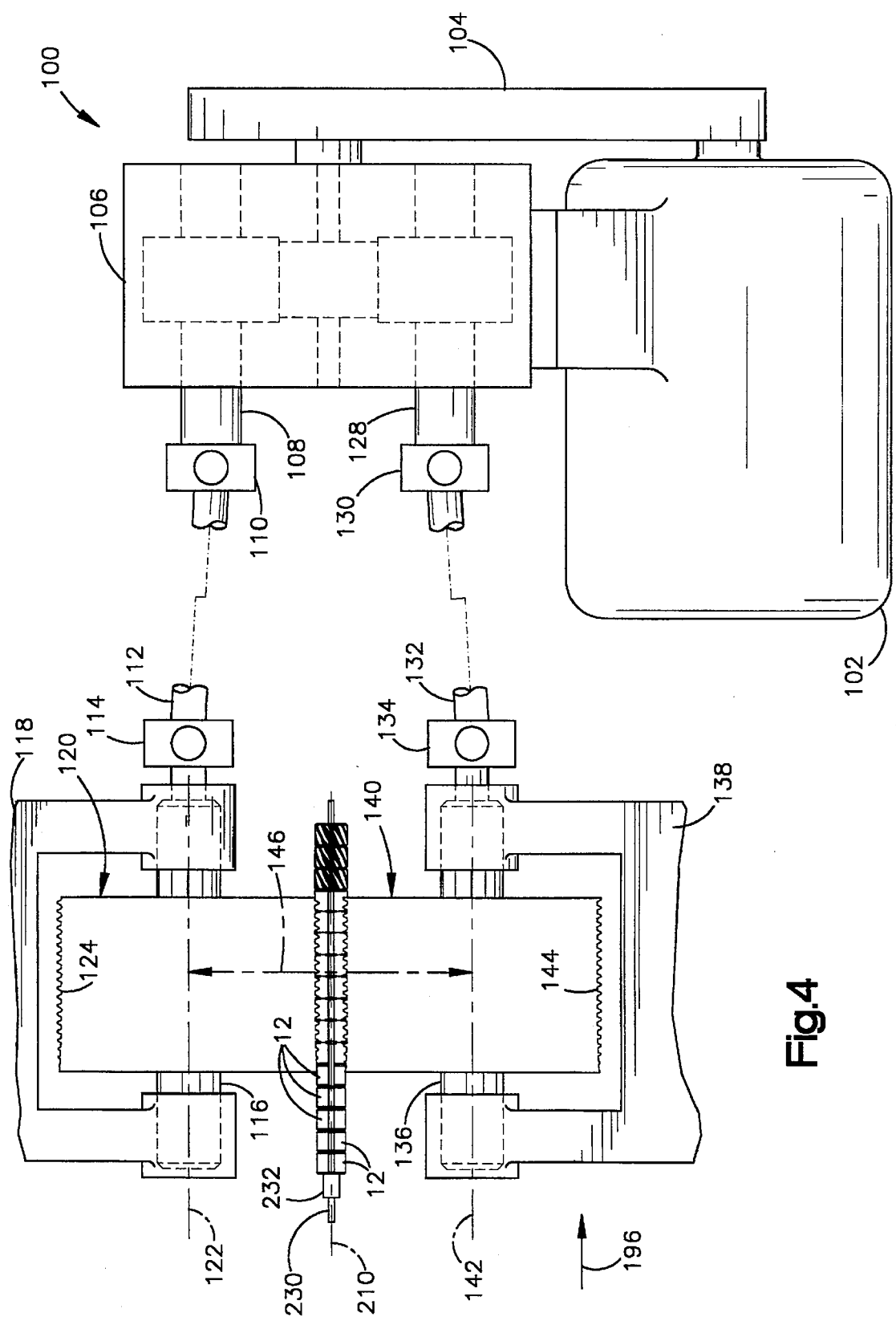
FIG. 4 illustrates a vertical roll machine for forming a helical gear teeth on powder metal gear blanks.

FIGS. 1 and 2 illustrate a press assembly 10 for making a powder metal gear blank 12 (FIGS. 2 and 3). The press assembly 10 includes a die 14 having first and second die portions 16 and 18. The first die portion 16 has a cylindrical inner surface 20. The surface 20, together with an upper surface 22 of the second die portion 18, defines a cavity 24 within the die 14. A chamfer 26 is formed on the second die portion 18 adjacent the cylindrical inner surface 20 of the first die portion 16.

The press assembly 10 includes a cylindrical core rod 30. The core rod 30 has on its outer surface a series of axially-extending splines 32. A punch 40 is supported for axial movement on the core rod 30. The punch 40 has a central opening 42 through which the core rod 30 extends. On the lower end of the punch 40, as viewed in FIG. 1, there is formed a chamfer 44. The chamfer 44 has a cross-sectional configuration which is a mirror image of the chamfer 26 on the second die portion 18.

To make the powder metal blank 12, a quantity of loose (uncompacted) powder metal 50 is placed within the cavity 24 in the die 14. The punch 40 is then moved axially, in a direction as indicated by the arrow 52, to compact the powder metal 50 within the cavity 24 between the punch and the second die portion 18. The first die portion 16 prevents radially outward movement of the powder metal 50 as the powder metal is being compacted.

After the powder metal 50 is compacted sufficiently (FIG. 2) to form the powder metal gear blank 12, the punch 40 is withdrawn from the die 14 in a direction indicated by the arrow 54. The powder metal gear blank 12 is then removed from the press assembly 10.

The powder metal gear blank 12 (FIG. 3), as thus formed, has a cylindrical outer surface 60 and a cylindrical inner surface 62 which defines a central opening 63 extending axially through the blank 12 between a first end 64 and a second end 66 of the blank. A series of splines 68 extend axially along the cylindrical inner surface 62 of the gear blank 12. The splines 68 result from the compaction of the powder metal 50 around the splined core rod 30. A chamfer 70 is present at the end 64 of the gear blank 12, as a result of the engagement of the chamfer 44 of the upper punch 40 with the powder metal 50 during compaction. Similarly, a chamfer 72 is present at the opposite end 66 of the gear blank 12, as a result of the engagement of the chamfer 26 of the second die portion 18 with the powder metal 50 during compaction.

The powder metal gear blank 12, although in a compacted state, is not sufficiently strong to be worked. Accordingly, as illustrated schematically in FIG. 3, the gear blank 12 is partially sintered with a known heat-treating assembly 80.

The gear blank 12 is sintered sufficiently to be cold rolled. When the gear blank is only partially sintered, the powder particles on the surface of the gear blank and for a short distance inward from the surfaces of the gear blank are bonded together. However, some powder particles in the interior of the gear blank 12 are not bonded together.

Alternatively, the gear blank 12 may be fully sintered at this time. When the gear blank 12 is fully sintered, all of the powder particles in the gear blank are bonded together. It is believed that it may be preferred to sinter the gear blank 12 only partially before cold rolling to facilitate cold working of the gear blank.

FIG. 4 illustrates a known vertical roll machine 100 for rolling helical gear teeth on a plurality of identical powder metal gear blanks 12 formed by the process of FIGS. 1–3. The roll machine 100 includes a drive motor 102 whose power is transmitted by a belt drive 104 to a transmission 106.

An upper transmission output shaft 108 is connected by a universal joint 110 with an upper drive shaft 112. The upper drive shaft 112 is connected by a universal joint 114 to a support shaft 116 journalled for rotation in an upper rolling die support 118. The support shaft 116 supports an upper rolling die 120 for rotation about an axis 122. The upper rolling die 120 has a 45° helical gear tooth form 124 on its outer periphery.

A lower transmission output shaft 128 is connected by a universal joint 130 to a lower drive shaft 132. The lower drive shaft 132 is connected by a universal joint 134 to a lower rolling die shaft 136 journalled for rotation in a lower die support 138. The shaft 136 supports a lower rolling die 140 for rotation about an axis 142. A 45° helical gear tooth form 144 is formed on the outer periphery of the lower rolling die 140.

The rotational axis 142 of the lower rolling die 140 extends parallel to the rotational axis 122 of the upper rolling die 120. The parallel axes 122 and 142 are spaced apart by a distance indicated by the arrow 146. The dies 120 and 140 define between them a passage 150 (FIG. 7).

Figure 5:
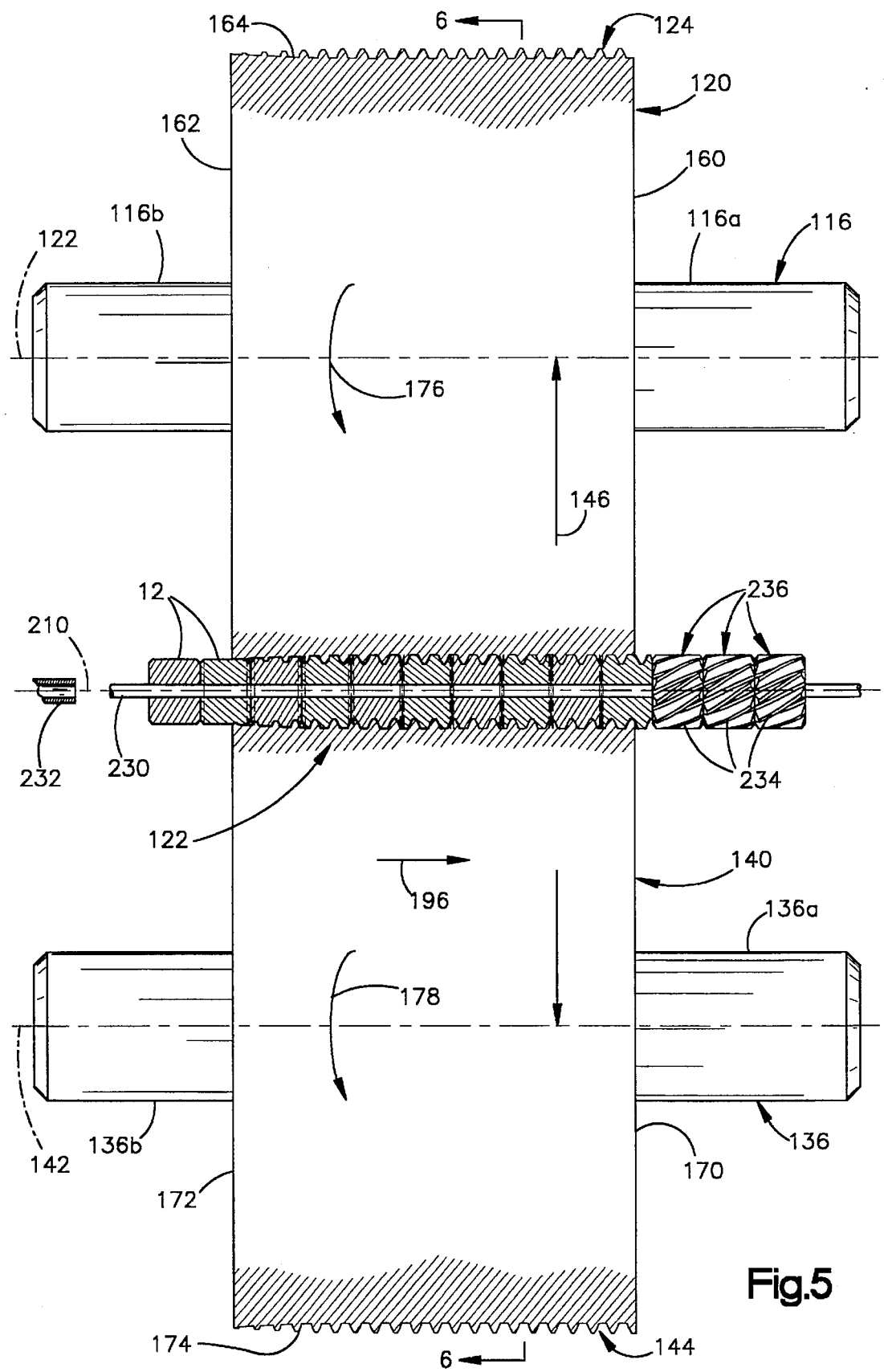
FIG. 5 is an enlarged view of a portion of the roll machine of FIG. 4 showing the rolling dies and a plurality of powder metal gear blanks being rolled simultaneously.
Figure 6:
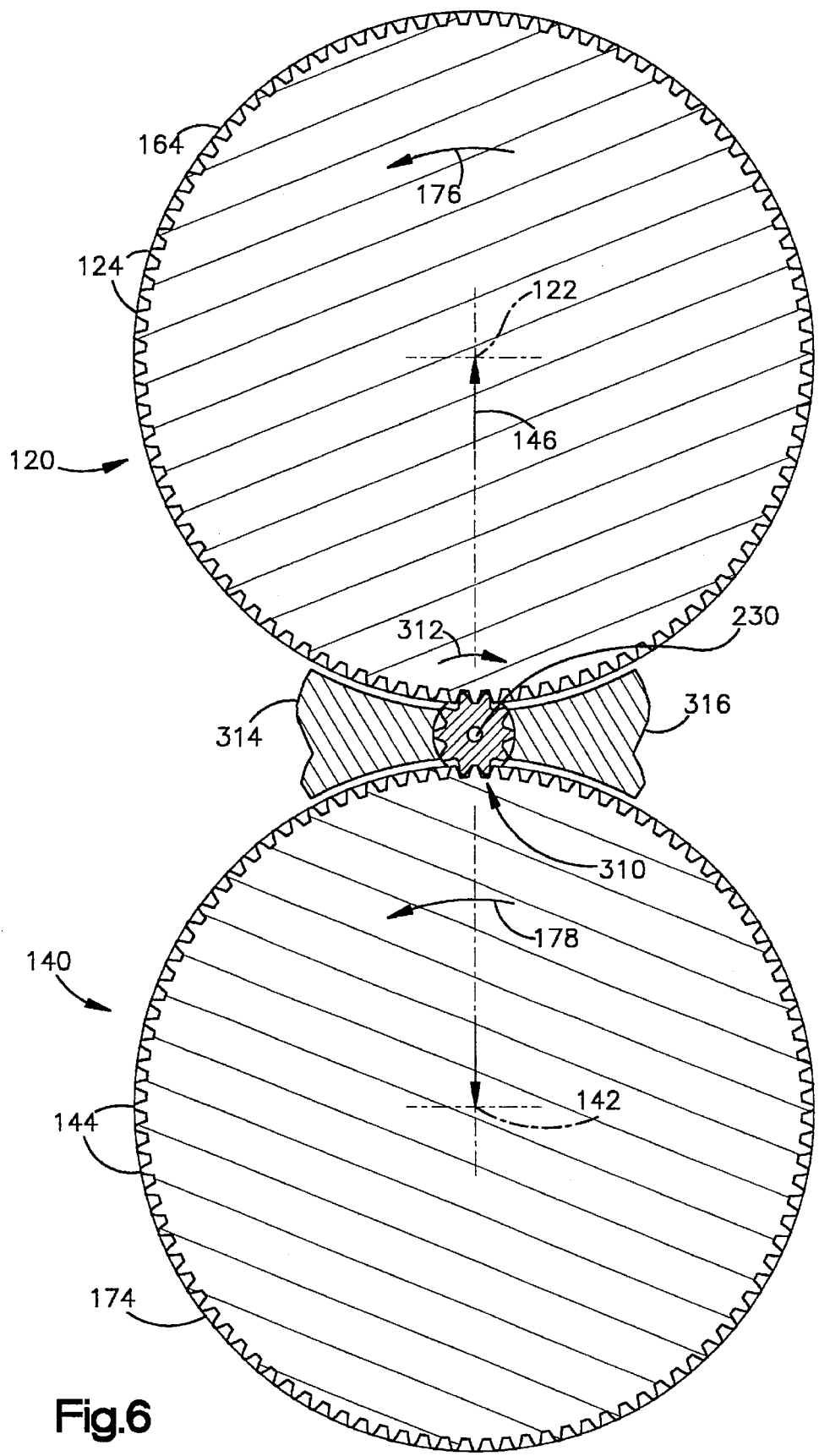
FIG. 6 is a sectional view taken along line 6—6 of FIG. 5.
Figure 7:
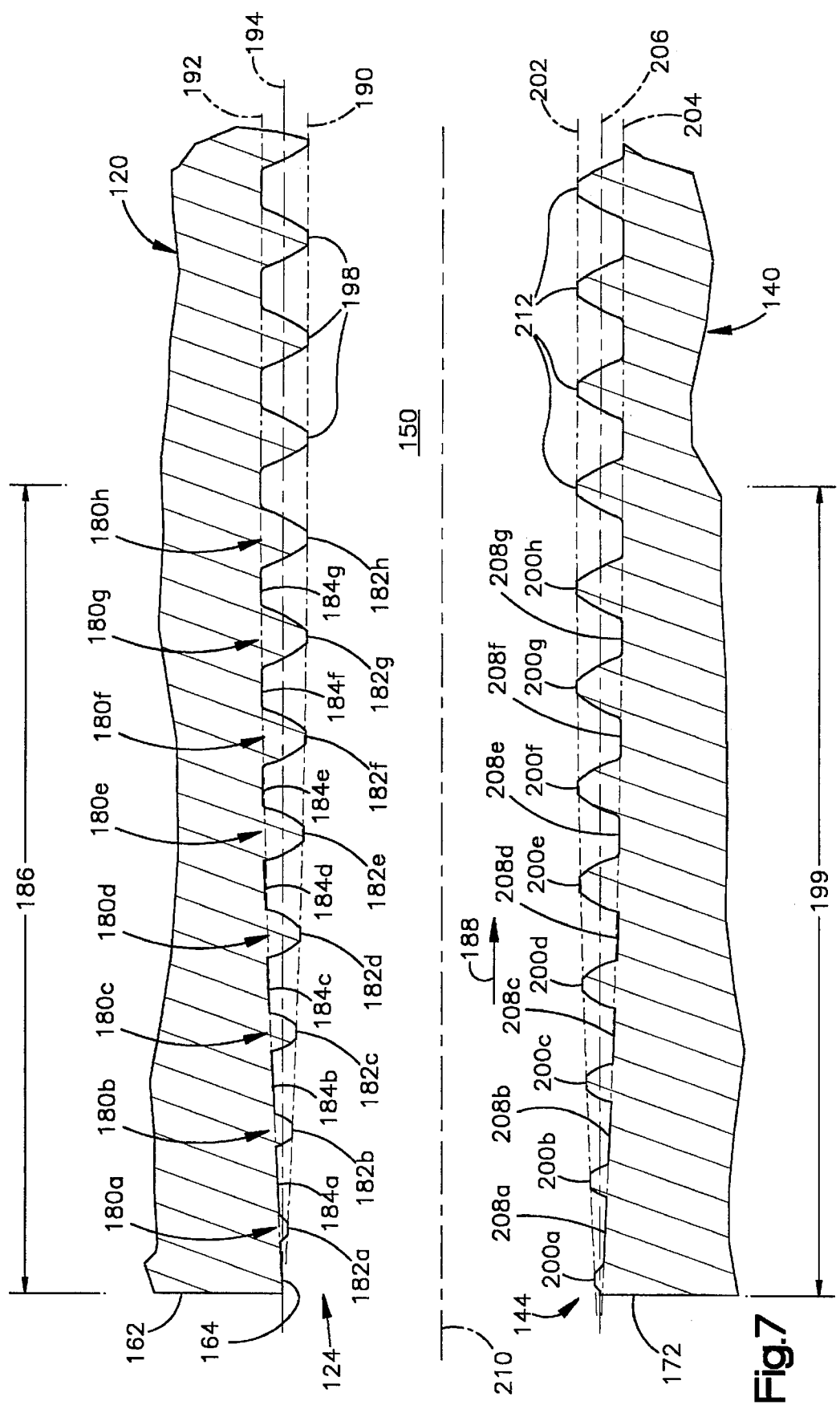
FIG. 7 is an enlarged partial sectional view of portions of the upper and lower rolling dies of the rolling machine of FIG. 4.

The upper and lower rolling dies 120 and 140 are illustrated in more detail in FIGS. 5, 6 and 7. The upper rolling die 120 has a pair of annular, radially-extending end faces 160 and 162 (FIG. 5). The helical gear tooth form 124 is formed on a cylindrical outer surface 164 of the die 120 extending about the axis 122 between the end surfaces 160 and 162. The support shaft 116 has two shaft portions 116a and 116b projecting axially outward from the respective end surfaces 160 and 162 of the upper rolling die 120.

The lower rolling die 140 is generally similar in configuration to the upper rolling die 120. The lower rolling die 120 has a pair of annular radially-extending parallel end surfaces 170 and 172. The helical gear tooth form 144 is on a cylindrical outer surface 174 of the die 140 which extends about the lower rolling die axis 142 between the die end surfaces 170 and 172. The support shaft 136 includes portions 136a and 136b projecting axially outward from the respective ends 170 and 172 of the lower rolling die 140.

The upper and lower rolling dies 120 and 140 are driven for rotation in the same direction by the drive motor 102 (FIG. 4). Specifically, the upper rolling die 120 is driven for rotation about its axis 122 in a direction as indicated by the arrow 176 in FIGS. 5 and 6. The lower rolling die 140 is driven for rotation about its axis 142 in the same direction as indicated by the arrow 178 in FIGS. 5 and 6.

The helical gear tooth form 124 (FIG. 7) of the upper rolling die 120 includes a series of gear teeth which wrap in a helical direction around the cylindrical outer surface 164 of the upper rolling die 120. The gear teeth 180a–180h are exemplary. The gear teeth 180a–180h have respective crests 182a–182h. The gear teeth 180a–180h are separated by a series of clearance curves or roots 184a–184g.

The gear tooth form 124 has a tapered lead-in portion 186 which is axially co-extensive with the gear teeth 180a–180h. Specifically, the addendum circle 190 of the gear tooth form 124 increases in diameter as measured at successive equally spaced points along the crests 182a–182h of the gear tooth form 124 taken in the feed direction 188. The clearance curves or roots 184a–184g, which are disposed intermediate the teeth 180a–180h, decrease in diameter in the feed direction 188. The dedendum circle 192 of the gear tooth form 124 decreases in diameter as measured at successive equally spaced points along the roots 184a–184g of the gear tooth form 124 taken in the direction 188.

Thus, the gear teeth 180a–180h increase in depth in a feed direction 188 (from left-to-right as viewed in FIG. 7) with the depth of the tooth 180b being greater than the depth of the tooth 180a; the depth of the tooth 180c being greater than the depth of the tooth 180b; and so forth, with the depth of the tooth 180h being greater than the depth of the tooth 180g.

A series of helical finishing teeth 198 extend from the tapered lead-in portion 186 of the gear tooth form 124 to the opposite axial end 160 of the upper rolling die 120. The finishing teeth 198 are all the same depth. The addendum circle 190 and the dedendum circle 192 have a constant diameter along the extent of the finishing teeth 198. The finishing teeth 198 extend for more than one half the axial length of the upper rolling die 120.

The gear tooth form 124 has a pitch circle 194 which extends parallel to an axis 210 of the rolling machine 100. The axis 210 extends between and is spaced equally from the upper rolling die 120 and the lower rolling die 140.

The gear tooth form 144 on the lower rolling die 140 is similar in configuration to the gear tooth form 124 on the upper rolling die 120. The lower rolling die 140 includes a tapered lead-in portion 199 with a series of gear teeth 200a–200h having progressively increasing depth as measured in the direction 188 from the end 172 of the lower rolling die 140 toward the opposite end 170. Thus, the diameter of the lower rolling die addendum circle 202 increases at successive points measured along the gear tooth form 144 in the direction 188, while the diameter of the lower rolling die dedendum circle 204 simultaneously decreases.

Specifically, the addendum circle 202 of the gear tooth form 144 increases in diameter as measured at equally spaced points along the crests 200a–200h of the gear tooth form 144 in the feed direction 188. Clearance curves or roots 208a–208g, which are disposed intermediate the teeth 200a–200h, decrease in diameter in the feed direction 188. The dedendum circle 204 of the gear tooth form 144 decreases in diameter as measured at equally spaced points along the roots 208a–208g of the gear tooth form 144 taken in the feed direction 188.

The area of the space between the dedendum circle 192 on the upper rolling die 120 and the dedendum circle 204 on the lower rolling die 140, as viewed in a plane extending through the central axes 122 and 142 (FIG. 5) of the rolling dies, remains constant throughout the length of the tapered lead-in portion 186 and the tapered lead-in portion 199. Thus, as the diameter of the dedendum circles 192 and 204 decrease in the feed direction 188, the diameters of the addendum circles 190 and 202 increase. As the tooth forms 124 and 144 in the tapered lead-in portions 186 and 199 progressively evolve to the fully developed form of the finishing teeth 198 and 212, the area of the space in the plane extending through the central axes 122 and 142 and the axis 210 remains constant at equal size increments along the axis 210. Thus, as the helical gear tooth forms 124 and 144 develop in the tapered lead-in portions 186 and 199, the diameters of the addendum circles 190 and 202 and the dedendum circles 192 and 204 change so that the spatial area between the gear tooth form 124 and the gear tooth form 144 remains constant in the plane which extends through the central axes 122 and 142 of the rolling dies 120 and 144.

The axis 210 of the passage 150 is disposed in the plane through the axes 122 and 142. The axis 210 of the passage 150 is parallel to the axes 122 and 142.

The crests 182a–182h of the gear teeth 180a–180h are aligned with the roots 208a–208g of the gear teeth 200a–200h. Thus, the central axis of the gear tooth 182b, as viewed in the plane extending through the central axes 122 and 142 of the rolling dies 120 and 144, extends midway between the gear teeth 200b and 200c on the lower rolling die 140. Similarly, the crests of the finishing teeth 198 on the upper rolling die 120 are aligned with the roots of the finishing teeth 212 on the lower rolling die 140

It should be understood that each of the gear teeth 180a–180h has a helical configuration around the periphery of the upper rolling die 120. The development of each of the gear teeth 180a–180h increases as the gear tooth wraps around the rolling die 120 in the feed direction 188. Thus, the configuration of the gear tooth 182a approaches the configuration of the gear tooth 182f as the gear tooth 180a wraps around the rolling die 120 in the feed direction 188. Similarly, the gear teeth 200a–200h wrap around the rolling die 140 and increase in development in the feed direction 188. The base helices of the helical gear tooth form 124 are the same as the base helices of the helical gear tooth form 144. The helical gear tooth forms 124 and 144 have the same diameter, lead, spiral angle and lead angle.

To the right of the gear tooth 200h as viewed in FIG. 7, and extending to the opposite axial end 170 of the lower rolling die 140, are the series of finishing teeth 212. The finishing teeth 212 all have the same depth. The finishing teeth 212 extend for more than one half the axial length of the lower rolling die 140.

The gear tooth form 144 has a pitch circle 206 which extends parallel to the pitch circle 194 of the upper rolling die 120 and parallel to the axis 210. The pitch circles 206 and 194 also extend parallel to the die axes 122 and 142.

Figure 8:
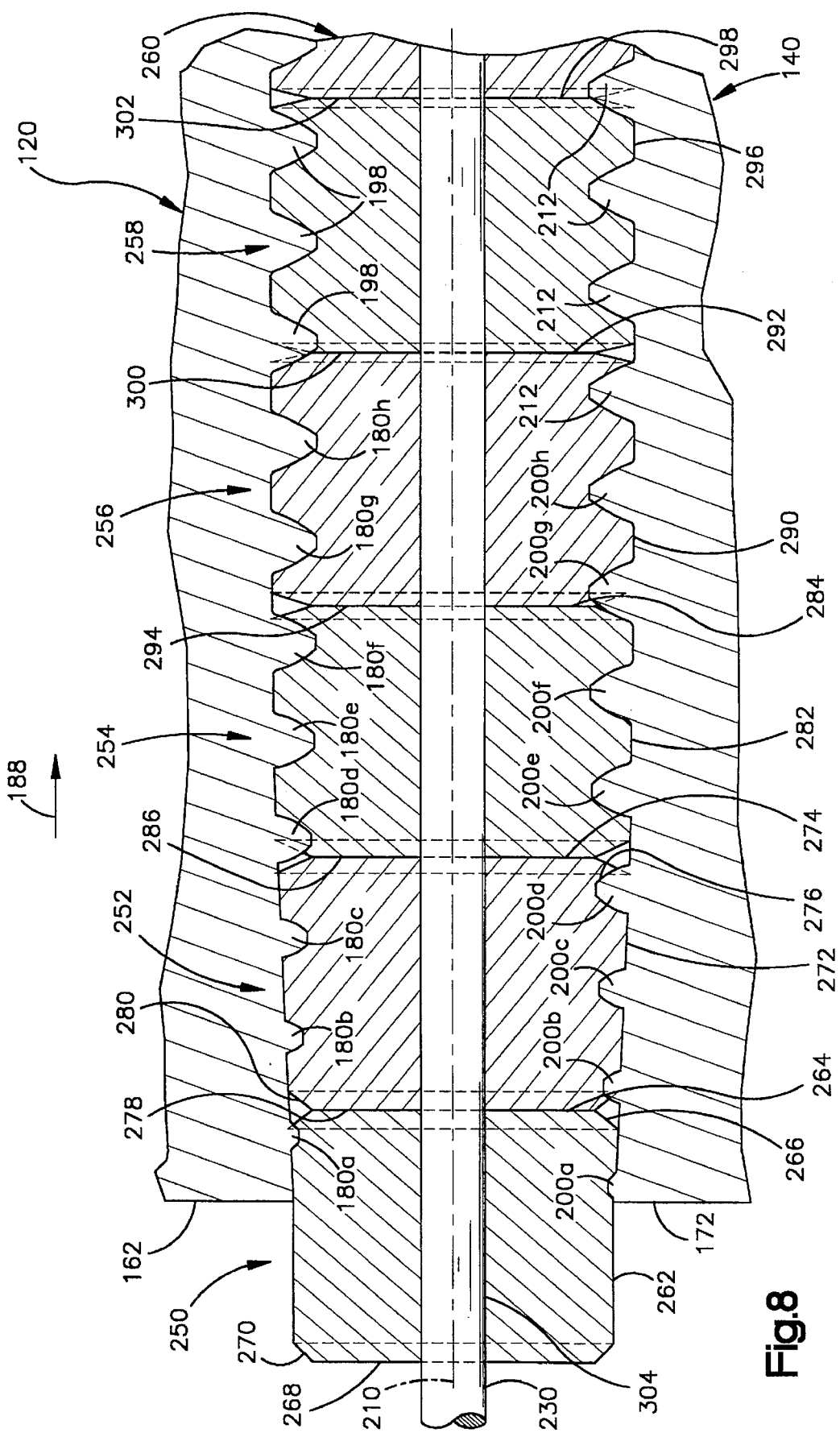
FIG. 8 is a view similar to FIG. 7 showing a plurality of powder metal gear blanks being rolled between the rolling dies.

FIGS. 4, 5 and 8 illustrate the operation of rolling helical gear teeth on a plurality of powder metal gear blanks 12. The gear blanks 12 are formed by the compacting process previously described in conjunction with FIGS. 1 and 2 and the heat treatment process described in conjunction with FIG. 3.

The general operation is as follows. A plurality of gear blanks 12 are stacked end-to-end on a support rod 230. The stack of gear blanks 12 is then moved axially into and through the passage 150 between the rotating rolling dies 120 and 140, by means of a pusher member indicated schematically at 232 FIGS. 4 and 5. Force transmitted from the pusher member 232 is transmitted to each of the gear blanks 12 by abutting engagement of opposite ends of the gear blanks. Thus, the pusher member 232 is effective to push each gear blank 12 in turn through the passage 150.

As the gear blanks 12 travel axially in the feed direction 188 between the upper and lower rolling dies 120 and 140, a helical gear tooth form complementary to the helical gear tooth forms 124 and 144 on the dies 120 and 140, respectively, is cold rolled on the outer surfaces of each blank 12. When the blanks 12 exit from the passage 150 between the rolling dies 120 and 140, a helical gear tooth form having a helix angle of 35° or more is present on each finished gear (FIG. 5). As the helical gear tooth form is rolled onto each of the gear blanks 12 in turn, the axially leading end of one blank is pressed against the axially trailing end of the next preceding blank under the influence of force transmitted from the pusher member 232.

More specifically, the rolling operation is as follows. FIG. 8 illustrates a series of gear blanks 250–260 being cold rolled between the upper and lower rolling dies 120 and 140. Each gear blank 250–260 has a cylindrical outer surface, a chamfered leading end, and a chamfered trailing end of powder metal compacted. Each gear blank 250–260 is identical to and is formed in the same manner as the gear blanks 12 (FIGS. 3–6).

Thus, the gear blank 250 (FIG. 8) has a cylindrical outer surface 262, a leading end 264 with a chamfer 266, and a trailing end 268 with a chamfer 270. The gear blank 252 has a cylindrical outer surface 272, a leading end 274 with a chamfer 276, and a trailing end 278 with a chamfer 280. The trailing end 278 of the gear blank 252 is in abutting engagement with the leading end 264 of the gear blank 250.

The gear blank 254 has a cylindrical outer surface 282, a chamfered leading end 284 and a chamfered trailing end 286. The trailing end 286 of the gear blank 254 is in abutting engagement with the leading end 274 of the gear blank 252.

The gear blank 256 has a cylindrical outer surface 290, a chamfered leading end 292, and a chamfered trailing end 294. The trailing end 294 of the gear blank 256 is in abutting engagement with the leading end 284 of the gear blank 254.

The gear blank 258 has a cylindrical outer surface 296, a chamfered leading end 298, and a chamfered trailing end 300. The trailing end 300 of the gear blank 258 is in abutting engagement with the leading end 292 of the gear blank 256. The gear blank 260, only a portion of which is shown in FIG. 8, has a chamfered trailing end 302 which is in abutting engagement with the leading end 298 of the gear blank 258.

The support rod 230 has a smooth outer surface and extends along the axis 210 of the rolling machine 100. The support rod 230 extends through splined central passages in each of the gear blanks 250–260, as exemplified by the central passage 304 in the gear blank 250. The gear blanks 250–302, as they are being worked between the rolling dies 120 and 140, rotate about the support rod 230.

As each gear blank moves axially along the axis 210 between the upper and lower rolling dies 120 and 140, a gear tooth form including a plurality of helical gear teeth is formed on the cylindrical outer surface of the gear blank. The gear teeth have crests skewed at an angle of 45° to the axis 210. The outer diameter of the gear blank increases and the depth of each gear tooth increases as that portion of each blank moves axially along the tapered lead-in portions 186 and 199 (FIG. 7) of the rolling dies 120 and 140. As each powder metal gear blank moves axially through the passage 150 between the upper and lower rolling dies 120 and 140, in the feed direction 188, the blank grows in diameter as gear teeth are formed on the blank by the rolling dies. The powder metal moves radially rather than axially during the rolling process. The volume of the powder metal blank remains substantially constant during the forming of the gear teeth. The volume decreases slightly and the density increases slightly as the powder metal is compacted slightly during the rolling process.

Thus, for example, the gear blank 250, a portion of which is beginning to be formed when in the position illustrated in FIG. 8, is engaged by the gear teeth 200a and 180a. The outer diameter of the gear blank 250 is only slightly greater than its original outer diameter. The axial length of the gear blank 250 is not changed by engagement of the gear blank with the gear teeth 200a and 180a.

The next preceding gear blank in the rolling machine 100, the gear blank 252, is engaged by and being formed by the gear teeth 180b and 180c on the upper rolling die 120, and by the teeth 200b, 200c and 200d on the lower rolling die 140. These gear teeth have progressively greater depths, and accordingly the outer diameter of the gear blank 252 increases as the gear blank 252 moves in the feed direction 188 through the rolling machine 100 from the position in which the gear blank 250 is shown to the position in which the gear blank 252 is shown. The root or inner diameter of the gear blank 252 decreases as the outer diameter of the gear blank increases. Therefore, the axial length of the gear blank 252 remains constant as the gear blank is cold worked by the upper and lower rolling dies 120 and 140.

In a similar manner, as each gear blank moves farther through the rolling machine 100 between the rolling dies 120 and 140, in the feed direction 188, the outer diameter of each gear blank increases and the depth of the teeth increases. However, the axial extent of each gear blank remains constant. After a particular gear blank passes axially through the rolling machine 100 to a location in which the gear blank is in engagement with the finishing teeth 198 and 212 on the upper and lower rolling dies 120 and 140, respectively, the outer diameter of the gear blank no longer increases. Rather, the series of finishing teeth 198 and 212, which all have the same depth, polish and smooth the helical gear tooth form on each gear blank.

It is thus apparent that before the helical gear teeth are completely rolled on any one particular gear blank, a helical gear tooth form has begun to be rolled on the next succeeding gear blank passing through the rolling machine 100. Thus, for example, the forming of the gear teeth on the blank 250 (FIG. 8) is commenced prior to completion of the forming of the gear teeth on the blank 252. Similarly, the formation of the gear teeth on the blank 252 is commenced prior to completing the forming of gear teeth on the blank 254; and so forth. Suitable means (not shown) may be provided to supply a constant succession of gear blanks 12 to be fed into the rolling machine 100 by the pusher 232 along the rod 230. For example, 1,000 or more gear blanks can be rolled in succession.

During the rolling of the powder metal gear blanks in the rolling machine 100, the distance between the axes of the upper and lower rolling dies is maintained constant. Specifically, the distance 146 (FIGS. 4–6) between the upper rolling die axis 122 and the lower rolling die axis 142 is maintained constant. That is, the upper and lower rolling dies 120 and 140 are not moved toward or away from each other during the rolling process. The rolling dies 120 and 140 are not moved toward each other to engage a powder metal gear blank to commence the rolling process for that gear blank. Rather, the axes of the rolling dies 120 and 140 are maintained in the same relative position during the complete time period in which any particular powder metal gear blank passes axially through the rolling machine 100.

A gear blank being cold rolled between the rolling dies 120 and 140, such as the gear blank 310 (FIG. 6), rolls about the axis 210 and the guide rod 230 in a direction of rotation 312 opposite to the directions of rotation 176 and 178 of the rolling dies 120 and 140. A pair of retainers 314 and 316, portions of which are shown schematically in FIG. 6, engage the tooth crests on the gear blank 310 to block movement of the gear blank out of position between the rolling dies 120 and 140.

The retainers 314 and 316 are necessary when rolling gear blanks which do not have a central passage extending completely therethrough, such as the gear blanks illustrated in FIG. 9 and described below. For such gear blanks, a support rod 230 can not be used to maintain the position of the gear blanks within the rolling machine 100. The retainers 314 and 316 are also advantageously used with gear blanks which have central passages through which the support rod 230 extends.

As the gear blanks 12 are fed into the rolling machine 100, the force of the pusher 232 is transmitted from the leading end of one gear blank to the trailing end of the next preceding gear blank. Thus, for example, the force of the pusher 232 is transmitted through the gear blank 250 (FIG. 8) and from the leading end 264 of the gear blank 250 to the trailing end 278 of the gear blank 252. This pushing force effects the initial entry of the gear blanks into the passage 150 between the rolling dies 120 and 140.

If the helix angle of the gear teeth being rolled on gear tooth blanks in the rolling machine 100 is large enough, the rolling dies 120 and 140 tend to draw the gear blanks axially through and out of the passage 150 in rolling machine 100. Specifically, if the helix angle is more than about 40°, then the rolling dies 120 and 140 tend to draw the gear blanks axially between the rolling dies. If the helix angle is less than about 40°, then the rolling dies 120 and 140 do not draw the gear blanks through and the gear blanks must be pushed through. The helix angle is the angle which the crest of a helical gear tooth makes with a central axis of a gear. The helix angle is always less than 90°.

The helical gear teeth are formed on the gear blanks within less than about one half of the axial length of the rolling dies 120 and 140. That is, the length of the tapered lead-in portion 186 of the upper rolling die 120, which is the distance between the left axial end 162 (FIG. 8) of the upper rolling die and the finishing teeth 198 on the upper rolling die, is less than one half of the axial length of the upper rolling die. Similarly, the length of the tapered lead-in portion of the lower rolling die 140, which is distance between the left axial end 172 of the lower rolling die 140 and the finishing teeth 212 of the lower rolling die, is less than one half of the axial length of the lower rolling die.

With the cold rolling process illustrated in FIGS. 1–8, it is possible to cold roll a 35° to 60° helical gear tooth form on a powder metal blank. Machining a 35° to 60° helical gear tooth form is substantially more expensive. Of course, the helical gear tooth form could have any desired helix angle within the 35° to 60° range. The specific helical gears illustrated in FIGS. 1–8 are formed with a 45° helix angle.

The powder metal gears illustrated in FIGS. 1–8 have 45° helical gear teeth Which extend for substantially the entire axial length of the gears. FIG. 9 illustrates powder metal gears which have 45° helical gear teeth extending for only a portion of the overall length of the gears. The remaining length of each gear is a stub shaft or hub formed integrally with the gear. Further, each gear has a splined cavity formed therein which extends for only a portion of the length of the gear.

Specifically, FIG. 9 illustrates a plurality of one piece powder metal gear blanks 350, 352, 354, and 356 disposed in the passage 150 between the upper and lower rolling dies 120 and 140. Each powder metal gear blank 350–356 has previously been formed in a powder metal compaction process similar to that illustrated in FIGS. 1–3. Each gear blank has a gear body with a splined cavity at one end and a projecting stub shaft or hub at the opposite end.

The gear blank 350 has a sintered powder metal gear body portion 360 with a cylindrical outer surface 362. An empty splined cavity 364 extends inwardly from a leading end 366 of the blank 350. A sintered powder metal hub or stub shaft 368 of the gear blank 350 extends from a trailing end 370 of the blank 350. The powder metal gear body portion 360 is formed as one piece with the powder metal hub 368. The cavity 364 has an end wall 371 disposed intermediate the ends 366 and 370 of the gear blank 350.

The gear blank 352 includes a sintered powder metal gear body 372 having a leading end 374. An empty splined cavity 376 extends axially inward from the leading end 374. A sintered powder metal hub or stub shaft 378 extends axially outward from the gear body 372. The powder metal gear body portion 372 is formed as one piece with the hub 378. The hub 378 includes a trailing end 380 of the blank 352. The trailing end 380 is in abutting engagement with the leading end 366 of the gear blank 350 and does not extend into the cavity 364. The cavity 376 has an end wall 381 disposed intermediate the gear ends 374 and 380.

The gear blank 354 has a sintered powder metal gear body 382 with a leading end 384. An empty splined cavity 386 extends inwardly from the leading end 384. A sintered powder metal hub or stub shaft 388 extends axially outward from the gear body 382. The powder metal gear body 382 is formed as one piece with the powder metal hub 388. The hub 388 includes a trailing end 390 of the gear blank 354. The trailing end 390 is in abutting engagement with the leading end 374 of the gear blank 352 and does not extend into the cavity 376. The cavity 386 has an end wall 391 disposed intermediate the gear ends 384 and 390.

The sintered powder metal gear blank 356, only a portion of which is shown, has a sintered powder metal hub or stub shaft 392 which is in abutting engagement with the leading end 384 of the gear blank 354. The hub 392 of the gear blank 356 does not extend into the cavity 386.

The gear blanks 350–356 move axially in the feed direction 188 in the passage 150 between the upper rolling die 120 and the lower rolling die 140. The blanks are oriented such that in each blank the gear body moves into the passage 358 between the rolling dies 120 and 140 prior to the hub.

The gear blanks 350–356 are illustrated in progressive conditions of gear tooth formations. For example, the 45° helical gear teeth are only slightly formed on the cylindrical outer surface 362 of the gear body 360 of the blank 350. The 45° helical gear teeth on the gear blank 352 are more fully formed as compared to the gear blank 350. The 45° helical gear teeth on the gear blank 354 are substantially fully formed.

The gear blanks 350–356 are sequentially pushed into the passage 358. The leading end of a gear body portion on one gear blank presses against the trailing end of the hub or stub shaft on the next preceding gear blank. Thus, the leading end 366 of the gear body portion 360 of the gear blank 350 presses against the trailing end 380 of the hub or stub shaft 378 on the gear blank 352. In the same manner, the leading end 374 on the gear blank 352 presses against the trailing end 390 of the hub 388 on the gear blank 354. A hollow cylindrical feed tube may be used to feed the gear blanks into the passage 358. If the helix angle to be formed on the gear blanks 350, 352, 354 and 356 is more than about 40°, the rolling dies 120 and 140 draw the gear blanks through the passage 358. However, if the helix angle is less than about 40°, the gear blanks must move through the passage 358 under the influence of force transmitted from the leading end of the body portion of one gear blank to the trailing end of the hub of the next preceding gear blank.

Because the splined cavities in the gear blanks 350–356 do not extend completely through the gear blanks, it is not possible to use a support rod such as the support rod 230 (FIG. 8) to guide movement of the gear blanks through the passage 150. Accordingly, the retainers 314 and 316 (FIG. 6) are used to block movement of the gear blanks 350–356 out of the passage 150 during rolling by the upper and lower rolling dies 120 and 140.

FIG. 10 illustrates a pinion gear assembly 400 including a 45° helical powder metal gear 404 formed by the rolling method of FIG. 9. The gear 404 includes a gear body 406 having 45° helical gear teeth 408. A splined cavity 410 extends axially inwardly from an end surface 412 of the gear body 406. The cavity 410 has an end wall 414 disposed intermediate the end surface 412 and an opposite end 416 of the gear 404. The end wall 414 extends radially and transversely to an axis 418 of the gear assembly 400. A hub or stub shaft 420 of the gear 404 extends axially from the surface 416.

The pinion gear assembly 400 also includes a metal shaft 402 (FIG. 10) having a cylindrical main body portion 430. A splined end portion 432 projects axially from one end of the main body portion 430. A drive portion 434 projects axially from the opposite end of the main body portion 430. The shaft 402 is machined from steel bar stock rather than being pressed from powder metal.

To assemble the pinion gear assembly 400, the shaft 402 is moved axially in a direction as indicated by the arrow 440 (FIG. 10). The splined end portion 432 of the shaft 402 is press fitted into the splined cavity 410 of the gear 404 as illustrated in FIG. 11.

The pinion gear assembly 400 is illustrated in FIG. 11 in meshing engagement with a helical spur gear 440. The main body portion 430 of the pinion gear assembly 400 is journalled for rotation on a bearing 442. The shaft portion 420 of the pinion gear assembly 400 is journalled for rotation on a bearing 444. As the pinion gear assembly 400 rotates, its gear teeth 408 engage gear teeth 441 on the spur gear 440 and the spur gear rotates also. A suitable drive mechanism (not shown) such as a V-belt or a threaded connection or other type of connection may be connected with the drive portion 434 of the steel shaft 402 of the pinion gear assembly 400.

The pinion gear assembly 400 is advantageous as compared to a one-piece machined pinion gear. It is significantly more expensive to machine a part having two shafts and a helical gear in between. The gear 404 is advantageously formed from compacted powder metal and cold rolled with 45° helical gear teeth in the manner illustrated in FIGS. 1–9. The shaft portion 420 may have a desired large diameter, to obtain maximum reduction, because it is formed integrally with the gear body portion 406 as one powder metal compact. For example, the diameter of the shaft portion 420 is preferably at least about 50% of the outside diameter of the gear body portion 406.

In order to obtain a large diameter on the steel shaft 402, the steel shaft 402 is made as a separate piece from the gear 404. The splined cavity 410 in the gear 404 can not be made too large in diameter, as that would result in weakening of the gear body portion 406. This limits the outside diameter of the splined cavity 410 to about 25% to 33% of the outside diameter of the gear 404.

Although only the gear 404 has been shown in FIG. 10, it should be understood that after each of the gear blanks 350-356 has been processed completely through the passage 358 extending between the upper and lower rolling dies 120 and 140, the gear blanks 350-356 will have the same configuration as the gear 404. Suitable shafts having the same construction as the shaft 402, are inserted into the cavities of the gears formed from the gear blanks 350-356 in the same manner as in which the shaft 402 is inserted into the cavity 410 formed in the gear 404.

FIGS. 13-15 illustrate a method of making a powder metal herringbone gear 500 which includes two 45° sintered powder metal helical gears formed as described above. The herringbone gear 500 includes a first powder metal gear 502 having a gear body 504 and a hub 506. The gear body 504 has 45° right-hand helical gear teeth 508 cold rolled in the manner described in conjunction with FIG. 9.

A smooth-walled cavity 510 (FIG. 13) is formed within the gear body 504. The cavity 510 extends along an axis 512 of the gear 500 from the right-hand end surface, as viewed in FIG. 13, of the gear body 504, partially but not completely through the gear body. The cavity 510 is defined by a smooth cylindrical inner surface and a radially-extending circular end wall.

The herringbone gear 500 also includes a second powder metal gear 520 having 45° left-hand helical gear teeth 522 cold rolled in the manner described in conjunction with FIG. 8. A splined central passage 524 (FIG. 13) extends completely through the gear 520 along the axis 512.

The herringbone gear 500 also includes a coupling shaft 530 having a main body portion 532, a drive portion 534, and a splined end portion 536. The coupling shaft 530 has the same general construction as the shaft 402 of FIG. 10. However, the splined end portion 536 of the shaft 530 has an axial extent which is only slightly less than the combined axial extent of the gear 520 and the cavity 510 in the gear body 504.

The component parts 502, 520 and 530 of the herringbone gear 500 are initially separate from each other. The splined end portion 536 (FIG. 13) of the shaft 530 is inserted partially within the splined central passage 524 of the left-hand gear 520. This couples the right gear 520 for rotation with the shaft 530. The shaft 530, the right gear 520, and the left gear 502 are aligned along the axis 512.

The herringbone gear assembly 500 is then disposed intermediate two sets of rotatable master gears 540 and 542 as illustrated in FIG. 13. The master gear 540 is a herringbone gear including a portion 544 having 45° left-hand helical gear teeth and a portion 546 having 45° right-hand helical gear teeth. The master gear 542 is identical to the master gear 540. The master gear 542 includes a portion 548 having 45° left-hand helical gear teeth and a portion 550 having 45° right-hand helical gear teeth. At this time, the left (as viewed in FIG. 14) end of the right gear 520 is disposed in engagement with the right (as viewed in FIG. 14) end of the left gear 502.

As illustrated in FIG. 13, the master gears 540 and 542 are initially spaced apart from the herringbone gear assembly 500. As illustrated in FIG. 14, the master gears 540 and 542 are then moved toward each other to engage between them the herringbone gear assembly 500. The master gears 540 and 542 are rotated in the same direction about their respective central axes to rotationally align the right-hand gear 502 with the left-hand gear 520.

Once the gears 502 and 520 are aligned rotationally with each other, the shaft 500 is moved axially in a direction as indicated by the arrow 552 so that the splined end portion 536 extends completely through the splined passage 524 in the left-hand gear 520 and into the smooth-walled cavity 510 of the right-hand gear 502. The splined shaft portion 536 is thus press fitted into the cavity 510, deforming the smooth wall of the cavity and coupling the shaft 500 for rotation with the gear 502. The left-hand helical gear 520 is maintained in rotational alignment with the right-hand helical gear 502 while performing the step of press fitting the splined shaft 536 into the smooth cavity 510 of the right-hand helical gear 502.

Once the splined shaft portion 536 has been press fitted into the cavity 510 in the helical gear 504, the master gears 540 and 542 are moved out of engagement with the gears 504 and 520 The resulting herringbone gear assembly 500 is then supported for rotation by the steel shaft 530. The stub shaft or hub 506, formed of powdered metal, supports the herringbone gear assembly to a lesser extent then does the steel shaft 530. However, the herringbone gear assembly 500 is supported by both the powdered metal stub shaft 506 and the steel shaft 530. The majority of the load applied to the herringbone gear assembly is transmitted through the relatively strong steel shaft 530.

From the above description of the invention, those skilled in the art will perceive improvements, changes and modifications in the invention. Such improvements, changes and modifications within the skill of the art are intended to be covered by the appended claims.

I claim:

1. A method comprising the steps of:

providing a pair of rotating rolling dies having helical gear tooth forms with a helix angle of 35° or more and having a passage between the dies;

stacking a plurality of powder metal gear blanks end-to-end on a support rod;

moving the stack of gear blanks in a feed direction axially into and through the passage between the rolling dies by means of a pusher member, said moving step including transmitting force from the pusher member to each of the gear blanks by abutting engagement of opposite ends of the gear blanks;

cold rolling on the outer surface of each gear blank a helical gear tooth form having a helix angle of 35° or more complementary to the helical gear tooth forms on the rolling dies as the gear blanks travel axially in the feed direction between the rolling dies; and pressing the axially leading end of one blank against the axially trailing end of the next preceding blank under the influence of force transmitted from the pusher member, as the helical gear tooth form is rolled onto each of the gear blanks in turn.

2. A method as set forth in claim 1 wherein the rotating rolling dies have helical gear tooth forms having a helix angle in the range of from about 45° to about 60°.

3. A method comprising the steps of:

compacting powder metal to form a plurality of generally cylindrical powder metal blanks;

forming gear teeth on each one of the plurality of powder metal blanks by rolling each one of the powder metal blanks between a pair of rolling dies rotating about parallel axes;

said step of forming gear teeth on the plurality of powder metal blanks by rolling including the step of maintaining the distance between the parallel axes constant during forming of the gear teeth on the powder metal blanks;

said step of forming gear teeth on each one of the plurality of powder metal blanks by rolling including (a) feeding the plurality of powder metal blanks one after the other axially between the rotating rolling dies with a first powder metal blank abutting against a second powder metal blank, and (b) commencing the forming of gear teeth on the second powder metal blank prior to completing the step of forming gear teeth on the first powder metal blank;

wherein said step of compacting powder metal to form a plurality of generally cylindrical powder metal blanks includes forming each powder metal blank with a gear body section and a shaft section;

said step of forming gear teeth on the powder metal blanks by rolling includes forming gear teeth on only the gear body sections;

and including the step of abutting the shaft section of a first powder metal blank against the gear body section of a second powder metal blank while forming the gear teeth on the second powder metal blank by rolling.

4. A method comprising the steps of:

compacting powder metal to form a plurality of generally cylindrical powder metal blanks;

forming gear teeth on each one of the plurality of powder metal blanks by rolling each one of the powder metal blanks between a pair of rolling dies rotating about parallel axes;

said step of forming gear teeth on the plurality of powder metal blanks by rolling including the step of maintaining the distance between the parallel axes constant during forming of the gear teeth on the powder metal blanks;

said step of forming gear teeth on each one of the plurality of powder metal blanks by rolling including (a) feeding the plurality of powder metal blanks one after the other axially between the rotating rolling dies with a first powder metal blank abutting against a second powder metal blank, and (b) commencing the forming of gear teeth on the second powder metal blank prior to completing the step of forming gear teeth on the first powder metal blank;

fixing a first powder metal gear for rotation with a second powder metal gear by inserting a steel shaft through the first powder metal gear into a recess in the second powder metal gear with the gear teeth of the first powder metal gear skewed in an opposite direction from the gear teeth of the second powder metal gear; and supporting the first powder metal gear from the steel shaft and supporting the second powder metal gear from a powder metal shaft formed as one piece with the second powder metal gear.

* * * * *